United States Patent [19]

Kariya et al.

[11] Patent Number: 4,540,991
[45] Date of Patent: Sep. 10, 1985

[54] THERMAL PRINTING SYSTEM

[75] Inventors: Izumi Kariya, Tokyo; Yzsuhito Eguchi, Kanagawa, both of Japan

[73] Assignee: Sony Corporation, Tokyo, Japan

[21] Appl. No.: 626,765

[22] Filed: Jul. 2, 1984

[30] Foreign Application Priority Data

Jul. 4, 1983 [JP] Japan .................................. 58-121170

[51] Int. Cl.³ .............................. H05B 1/02; B41J 3/20
[52] U.S. Cl. .................................. 346/76 PH; 346/1.1; 219/216
[58] Field of Search .................... 346/76 PH, 76 R, 1.1, 346/139 C; 400/120; 219/216; 364/518–523; 250/317.1, 318; 101/DIG. 2

[56] References Cited

U.S. PATENT DOCUMENTS

| 4,330,786 | 5/1982 | Hatabe et al. | 219/216 |
| 4,345,845 | 8/1982 | Bohnhoff et al. | 101/DIG. 2 |
| 4,434,356 | 2/1984 | Craig et al. | 400/120 |
| 4,435,624 | 3/1984 | Horlander | 346/76 PH |

Primary Examiner—E. A. Goldberg
Assistant Examiner—A. Evans
Attorney, Agent, or Firm—Lewis H. Eslinger; Alvin Sinderbrand

[57] ABSTRACT

A thermal transfer printing system of the kind having a plurality of resistive elements substantially aligned for printing an image line-by-line includes a resistance value variation detector selectively connected to each of the resistive elements in order to derive compensation data based upon resistance variations in such elements. The resistant compensation data is retained in a memory at addresses corresponding to each of the resistive elements in the printing head and the compensation information is read-out from the memory to thereby compensate the printing data prior to being fed to the thermal printing head.

18 Claims, 4 Drawing Figures

THERMAL PRINTING SYSTEM

BACKGROUND OF THE INVENTION

1. Field of the Invention

The present invention relates generally to thermal printing apparatus and, more specifically, to a thermal transfer printing system for producing a printed image of a recorded signal by use of selectively energized heating elements and an ink ribbon having a sublimable dye.

2. Description of the Prior Art

Following use of a video camera, such as the known electronic still camera that is capable of recording signals representing an image or other video information on a magnetic sheet or disc, it is generally desirable to obtain a hard copy or print of the recorded video information. One proposed system for supplying a hard copy employs a thermal transfer printing system wherein an ink ribbon having a sublimable dye is employed. Such proposed thermal printing system typically also uses a rotatable platen and a thermal print head, with the paper being wound around the platen and rotated in a step-by-step fashion in front of the thermal print head that is connected to receive the recorded image signals. The ink ribbon include three, separately arranged, color-dye areas, and each color is completely printed onto the paper in succession. Additionally, a black-dye area is employed to highlight and add definition to the printed color image. The heat produced by the energization of the individual heating elements forming the thermal print head causes the sublimable dye coated onto the ink ribbon to be thermally transferred to the printing paper arranged around the platen.

The thermal print head is typically formed of up to 500 heating elements, each of which corresponds to a numbered dot forming one vertical line of the picture image. The heating elements comprise a plurality of individual resistive elements each having a separate input lead connected to be driven by a pulse signal to generate the heat. The video signals typically are modulated in pulse width form and fed to the respective heating elements utilizing overall system timing. By using pulse width modulation, if the amplitude of the color signal is large then the heating element is driven for a longer duration of time, so that the thermally transferred amount of sublimable dye is increased, thereby to provide a greater printing density.

In the thermal printing head the resistive heat elements are horizontally aligned and due to manufacturing tolerances some deviation in the actual resistance value of the heating elements will always be present. Because the heat generated will be correspondingly varied because of the resistive variations, the density of the resultant print will also have undesirable variations. There have been several techniques proposed to prevent these variations in the density of the resultant print, such as employing a separate power source for each of the heating elements forming the thermal head. Another proposed approach was to provide an individual balancing resistor for each of the heating elements in the head and still another technique proposed to adjust the electrical power applied to each of the resistive elements following production of an unacceptable print. In all of these previously proposed approaches, the technique of controlling the electric power consumption has proven to be the most favorable in compensating for fluctuations of the resistance value caused by manufacturing tolerance deviations. Nevertheless, in all of the suggested approaches a separate, individual circuit for each head element is required, so that the resultant circuit arrangement for the thermal printing system becomes overly complex and expensive because of the high fabrication costs.

OBJECTS AND SUMMARY OF THE INVENTION

Accordingly, it is an object of the present invention to provide a thermal printing system for providing a printed copy of video information signal that eliminates the above-noted defects inherent in the prior art.

Another object of this invention is to provide a thermal printing system having a relatively uncomplicated configuration compared to known systems that produces a high-quality, thermally transferred picture image without undesirable variations in the density thereof.

A further object of the present invention is to provide a thermal printing system capable of producing printed copies having no unacceptable density variations and which can be manufactured at relatively low cost compared to known systems.

In accordance with an aspect of the present invention, a thermal printing system of the kind having a printing head formed of a plurality of resistive elements arranged substantially in a line for printing an image line by line includes a reference resistor that is selectively connected to each of the resistive elements in the head for deriving voltage data that corresponds to the actual resistance value of each of these resistive elements. A memory is connected to the reference resistor to store the voltage data derived thereby and a compensator is provided that is connected to the memory to compensate the printing signal fed to the individual heating elements in accordance with the voltage data stored in the memory.

The above and other objects, features, and advantages of the present invention will become apparent from the following detailed description of illustrative embodiments thereof to be read in conjunction with the accompanying drawings, in which like reference numerals designate the same elements and parts.

DESCRIPTION OF PREFERRED EMBODIMENTS

Figure 1:
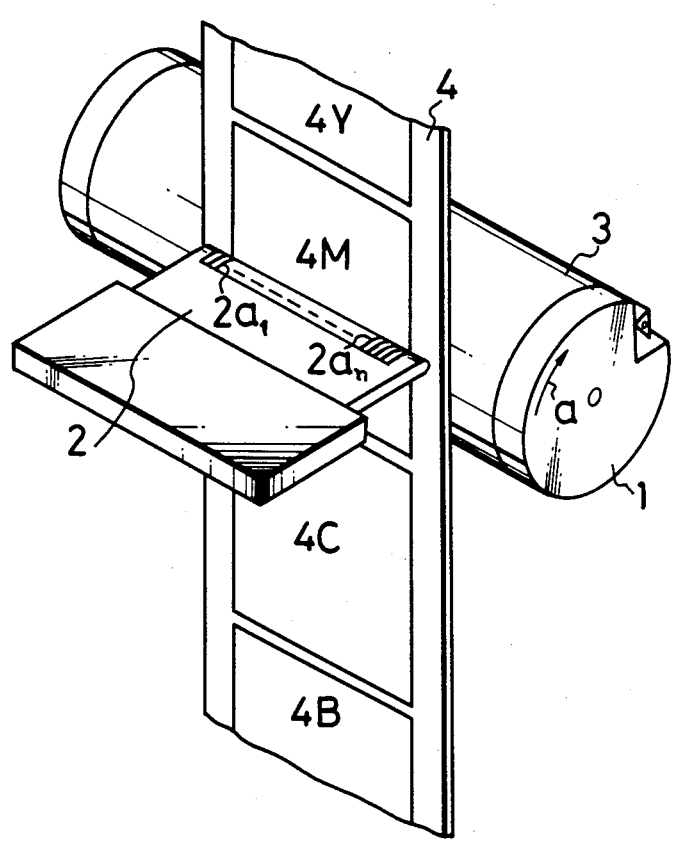
FIG. 1 is a perspective view of a typical thermal printing system employing a thermal head and an ink ribbon having sublimable, color dyes coated thereon.

FIG. 1 represents the essential elements of the thermal printing system, specifically, platen 1 is arranged to cooperate with thermal print head 2 and has wound or arranged thereabout a sheet of printing paper 3. Platen 1 is arranged to be rotated, in a step-wise fashion, in a direction shown by arrow a. A multi-color, dye-carrying ink ribbon 4 is arranged between the thermal print head 2 and paper 3 wound about platen 1, and the dye-carrier, color-ink ribbon 4 is preferable contained in a cartridge (not shown) with the cartridge being arranged for removable installation in the thermal printing system. Dye-carrier, color-ink ribbon 4 is made of a condensor paper coated with sublimable dye and in this embodiment is formed of a series of frames 4Y, 4M, 4C, and 4B, in which are contained respective different color dyes. In this example the colors used are the subtractive colors, yellow, magenta, and cyan, with black being added to improve definition. This series of different color ink frames is then repeated over the entire length of ink ribbon 4. By energization of thermal head 2, the color sublimable dye of each frame is thermally transferred to printing paper 3.

Thermal head print head 2 may be formed of up to 500 heat elements $2a_1$–$2a_n$ each of which correspond to a numbered dot of one vertical line of a picture image. The plurality of resistive elements $2a_1$–$2a_n$ are driven by a pulsed signal and thereby generate heat to cause the dye to sublime and pass onto the paper. The video signals representing the picture to be printed, which consist of the color signals yellow, magenta, cyan, and black, are mcdulated using pulse width modulation and are fed to the respective heat elements in accordance with conventional system timing. The pulse width modulation of the drive signals means that when the amplitude of the color signal is larger, then the respective heat element will be driven for a longer length of time thereby providing a increase in the resultant printing density. Additionally, by utilizing this pulse width modulation technique up to thirty-two gradations of density can be produced in accordance with the variations in the amplitude of the color signal.

In the system of FIG. 1, dye-carrier, color-ink ribbon 4 is in contact with printing paper 3 and is resiliently pressed thereagainst by thermal print head 2. Dye-carrier, color-ink ribbon 4 is then moved in a step-by-step fashion in synchronism with the movement of printing paper 3, as it is driven by the incremental rotation of platen 1. Initially, yellow frame 4Y of dye-carrier, color-ink ribbon 4 is in contact with printing paper 3 and at that time the drive signal corresponding to the yellow color signal is fed to thermal print head 2. After thermal transfer of the yellow dye component in one vertical line is completed, platen 1 is rotated by one step in the direction shown by arrow a and the next line is ready to be thermally transferred. This continues until the entire yellow portion of the image has been thermally transferred to printing paper 3.

Once the yellow frame 4Y has been applied, the same operation is sequentially undergone in relation to the magenta, cyan, and black frames, 4M, 4C, and 4B, respectively. That is, the thermally transferred picture image of the magenta color is superimposed on the thermally transferred yellow color and all the other colors are then superimposed one on top of the other, thereby providing a full color picture image on the paper 3.

Figure 2:
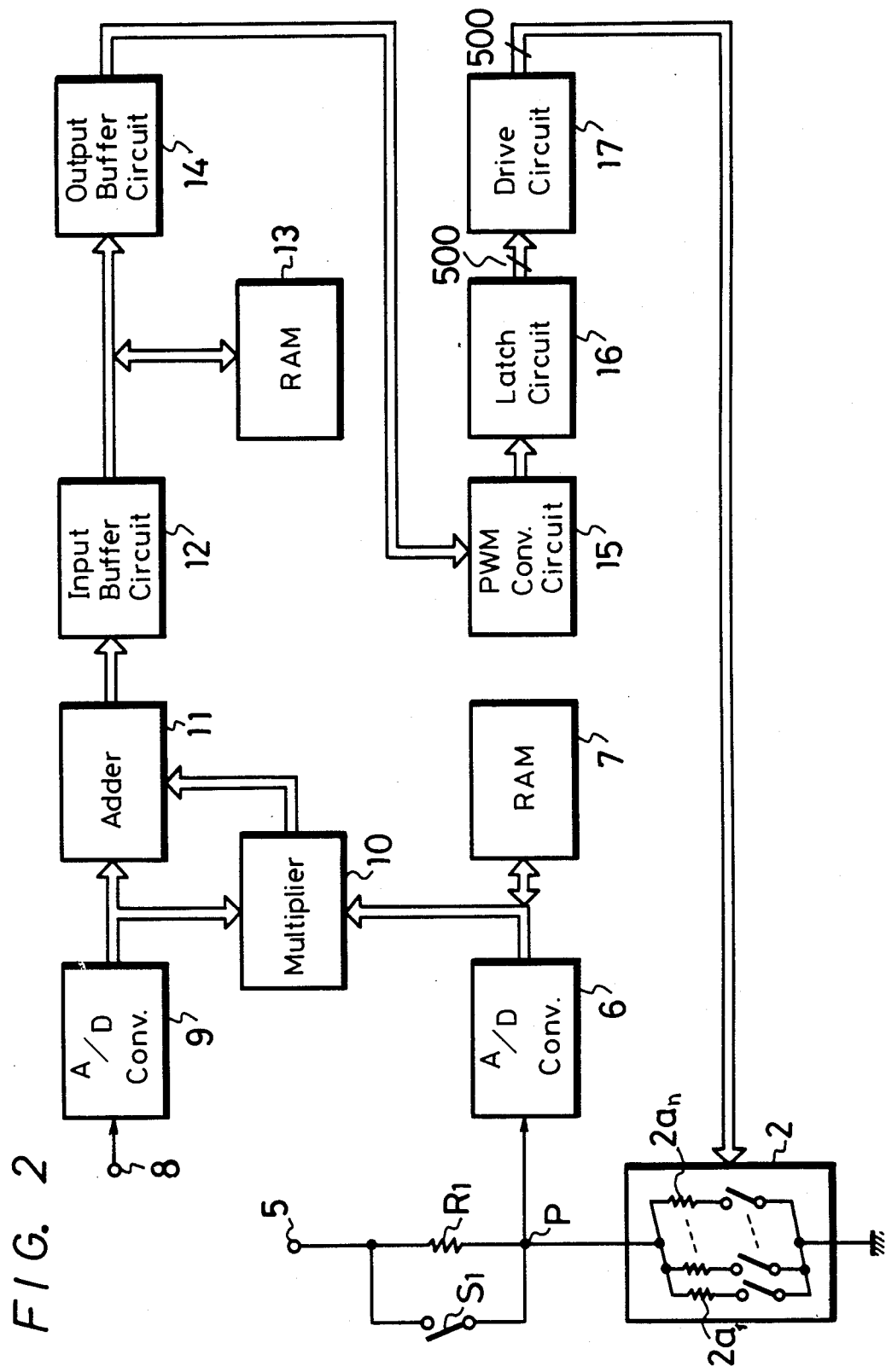
FIG. 2 is a block diagram of a thermal printing system according to one embodiment of the present invention.

It is the individual resistive elements $2a_1$–$2a_n$ that form thermal print head 2 that have the variations in actual resistance value, which is compensated by the present invention, and FIG. 2 represents an embodiment of a thermal printing system according to the present invention which overcomes the problem presented by the distributed variation in the resistive elements forming the print head. Specifically, power source terminal 5 has connected thereto a voltage that is used to drive thermal print head 2 during a resistance-variance detection operation. More specifically, the voltage is selectively applied to terminal 5 and is supplied through reference resistor R1 to a common terminal of all of the resistive elements $2a_1$–$2a_n$ of thermal print head 2. The other side of resistive elements $2a_1$–$2a_n$ is connected through a respective switch to relative ground potential. The switches connecting each resistive element $2a_1$–$2a_n$ to ground are controlled by the pulse width modulated print data signal, explained in detail hereinbelow. Switch S1 is connected in parallel with reference resistor R1 and during the detection operation switch S1 is open, as shown in FIG. 2. Following completion of the detection operation, switch S1 is closed and resistor R1 is taken out of the circuit. A voltage developed at junction P between reference resistor R1 and thermal print head 2 is converted to a digital signal of, for example, four bits, by analog-to-digital convertor 6.

The four-bit digital signal produced by analog-to-digital convertor 6 is supplied to random-access memory (RAM) 7 of sufficient capacity to have addresses corresponding to the up to 500 individual resistive head elements $2a_1$–$2a_n$, and each four-bit digital signal is stored at its predetermined storage location in RAM 7 with the same address as that of the corresponding designated resistive head element in thermal print head 2. In other words, each of the resistive elements $2a_1$ through $2a_n$ is in turn connected in series with the voltage source at terminal 5 and reference resistor R1 and the appropriate voltage converted to a four-bit digital value and stored at the corresponding address in RAM 7. In the embodiment of FIG. 2, thermal print head 2 is schematically represented as having each of the resistive elements $2a_1$ through $2a_n$ connected to relative ground potential by an individual switch, however, the resistive elements may be also switched electronically utilizing latches or the like, and the mechanical switches in FIG. 2 are shown just for purposes of clarity. Additionally, storage of the four-bit digital signals in RAM 7 for each of the resistive elements $2a_1$–$2a_n$ may be be accomplished each time that the thermal printing system is switched on, thereby providing a constant updating of the detected resistance-variation data in RAM 7.

Now, if switch S1 is opened as shown in FIG. 2 and the individual resistive elements $2a_1$–$2a_n$ are sequentially turned on one-by-one, and if the power source voltage is represented as $V_{cc}$ and the resistance of the elements $2a_n$ are taken as rn, wherein n = 1, 2, ... 500, a voltage $V_{pn}$ at junction P between reference resistor R1 and resistive element $2a_n$ can be expressed as follows for the case when the nth resistive element $2a_n$ is turned on.

$$V_{pn} = \frac{rn}{R1 + rn} \cdot V_{cc} \qquad (1)$$

This voltage $V_{pn}$ is then converted to the four-bit digital signal by analog-to-digital convertor 6 and stored in RAM 7 at the predetermined corresponding storage address, as representing data corresponding to the resistive value of each individual head element $2a_n$.

The video signal that is being reproduced, and which is to be the subject of the print, is an analog serial signal fed in at input terminal 8 to analog-to-digital convertor 9. Analog-to-digital convertor 9 produces an eight-bit digital signal therefrom which is then fed both to digital multiplier 10 and also to digital adder 11. Analog-todigital convertor 9 can be selected to digitize the input signal to words of any bit length, and the eight-bit words are chosen just for this example. The four-bit digital data relating to each of the individual resistance elements $2a_n$ in thermal print head 2 that are contained in RAM 7 are fed also to multiplier 10 in such order to correspond to the eight-bit digital signal for energizing the nth head element, so that both digital data words are multiplied by each other in digital multiplier 10. In other words, because the digital printing information being fed out of analog-to-digital convertor 9 relates to each of the heating elements $2a_1$–$2a_n$ sequentially in print head 2, then RAM 7 can be read out in the same sequence, that is, from $2a_1$ to $2a_n$, where n equals 500 in this example, and the respective digital words multiplied with each other in multiplier 10. In this example, a multiplication of the two respective words can result in digital data of twelve bits, however, the variations in the printing density due to the respective variations in the resistance values of the resistive elements in print head 2 are different for each printing system and, thus, the product word sizes for different printing systems need not necessarily the same. In this example, the twelve-bit data is bit shifted to be suitable for this printing system and is fed to adder 11 as the detected compensation amount word. Digital adder 11 adds this compensation word to the original data signal produced by analog-to-digital convertor 9. Thus, a compensated data signal is generated for every one of the head elements $2a_1$–$2a_n$ and is fed out from adder 11 through an input buffer circuit 12 to a second random-access memory (RAM) 13 and therein stored at storage locations corresponding to the predetermined addresses designated for each of the 500 head elements $2a_1$–$2a_n$. The data stored each time in RAM 13 is the data that has been compensated by the amount corresponding to the detected variation in the resistance value relative to the original print data that was supplied to adder 11 from analog-to-digital convertor 9.

Because the system of FIG. 2 employs digital multiplier 10 to obtain the compensation signal, the compensated amount has a linear relationship with the voltage fluctuations at junction point P. Therefore, the printing density depends on a heat quantity Q, which may be expressed as:

$$Q = \frac{V^2}{R} t \qquad (2)$$

where V is the terminal voltage of the resistive elements, R is the resistance value of the resistive element, and t is the conducting time. Thus, the density of the resultant print based upon variations of the resistance value will be in an inverse relationship with the actual resistance value R of the resistive elements and will be proportional to the conduction time, relative to the pulse width modulated signal. As a result, it is sufficient that the conducting time t be compensated to be linear in response to distributed variations in the resistive value R.

The output signal formed of the eight-bit words each generated by RAM 13 is fed through output buffer circuit 14 to pulse-width modulation converting circuit 15, which converts its digital input signal to a pulse width modulated signal, that is, the compensated signal relative to each head element $2a_1$–$2a_n$ serially supplied from RAM 13 is converted to a pulse width modulated signal. The pulse width modulated signals are fed to latch circuit 16, in which signals designating the conduction time each head element $2a_1$–$2a_n$ are accumulated for an entire line. In this embodiment there are 500 possible signals to be stored in latch circuit 16 since there are 500 heating elements in the head. The accumulation of the pulse-width-modulated signals for one vertical line amount in latch circuit 16 and the output operation of the accumulated signals to drive circuit 17 are both carried out based on a gating signal (not shown), which gates the latch circuit 16 during a predetermined time period. Thus, the drive signals that energize the thermal print head 2 are supplied from drive circuit 17 to the thermal print head 2 for a time period sufficient to form an entire one-color, vertical line of the resultant picture image. Then, each of the 500 heating elements $2a_1$–$2a_n$ is turned on for a time period that is determined by the time during which the pulse-width-modulated signal fed to each of the heating elements is at a high level or is a "1".

In the embodiment of FIG. 2, because the compensating signal for the printing data formed by digital multiplier 10 is based on the variations in the resistance value data for each of the heating elements $2a_1$–$2a_n$ of thermal print head 2 and the input printing data is compensated for in digital adder 11, even if the resistive value data in adder 11 is scattered, the printing data to determine the conducting time of each of head elements $2a_1$–$2a_n$ is compensated in corresponding order so as to prevent irregular printing density by scattering of the resistive values. Then, the print head control signal that results from compensating for information regarding such conducting time caused by such scattering of the resistance values is converted to the pulse-width-modulated signal, supplied to each head element $2a_1$–$2a_n$ of thermal print head 2, and is sequentially printed out line-by-line to form the respective, superposed color images.

Each time the data representing a particular one of the four colors (yellow, cyan, magenta, and black) is fed in at input terminal 8, the data is digitized and then compensated by reading out the digital voltage values from RAM 7 and multiplying the input data therewith in multiplier 10. The output of multiplier 10 is then added to the digitized input signal in adder 11 and the compensated signal used to energize the print head. Thus, this reading out of RAM 7 and the performance of the compensation occurs for the data of every vertical line of each of the four color dye frames on the ribbon, which are used to form the color print of the recorded image.

As described above according to this embodiment, because the resistance value data regarding each of the head elements $2a_1$–$2a_n$ is detected, stored in RAM 13, and used to compensate the conduction time of each of the head elements in response to the detected scattering of the resistance value of the head elements, the heat quantity generated by each head element can be made to be identical to the case where the resistance values are not scattered, that is, identical to the ideal situation when all resistances are the same exact value. As a result, it becomes possible to obtain an excellent thermally transferred picture evidencing no scattering of printing density by the relatively simple circuit arrangement shown in FIG. 2. Moreover, according to the present invention, even if there are a large number of head resistive elements having different conducting times, such resistive elements can be turned on simultaneously and the conducting times thereof can be compensated. Additionally, according to this embodiment, there is the advantage that the printing density can be prevented from being scattered by controlling the conducting time of the head elements in accordance with previously detected variations of the resistance.

Figure 3:
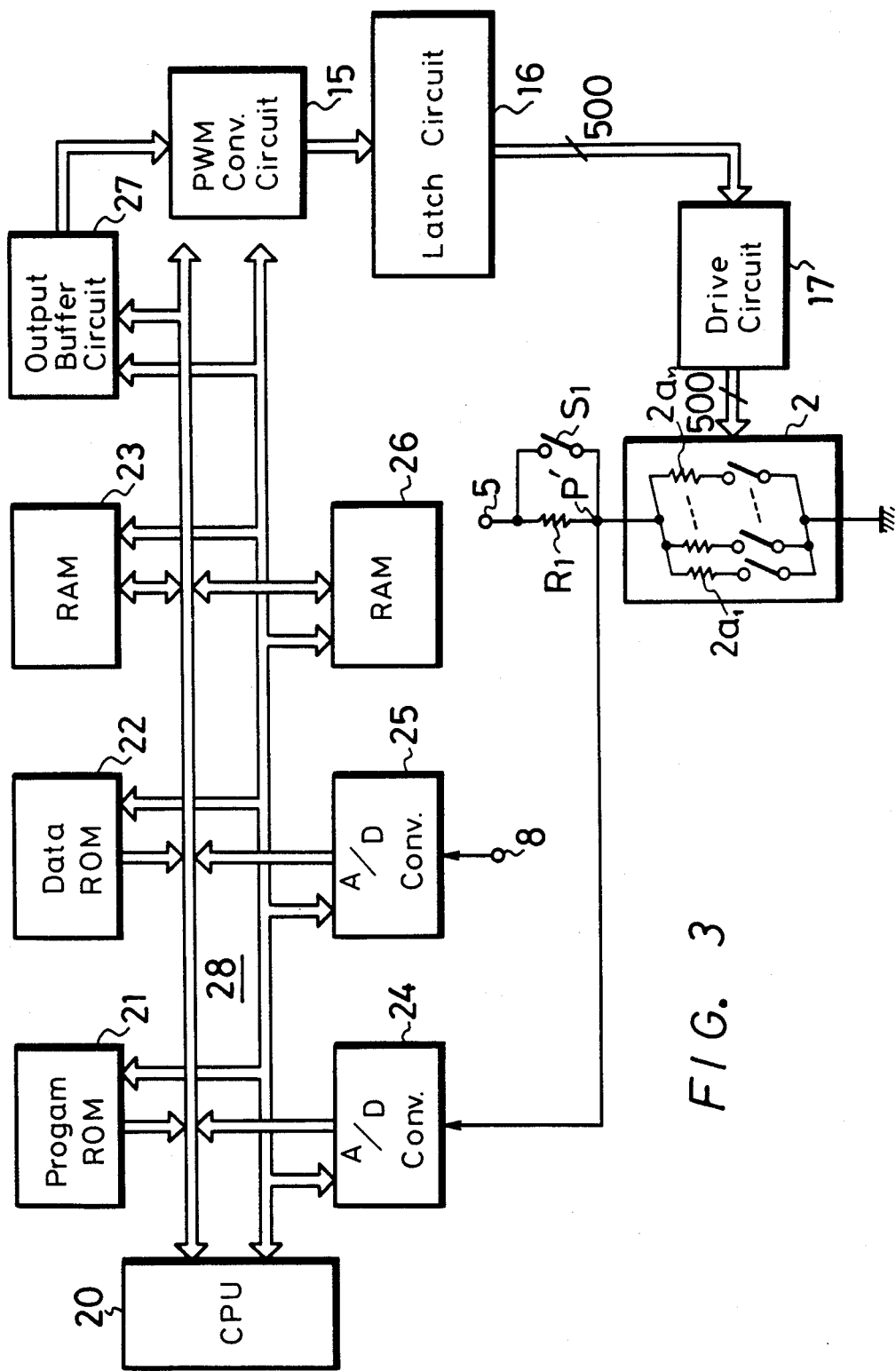
FIG. 3 is a block diagram of a thermal printing system according to another embodiment of the present invention.

FIG. 3 is another embodiment of a thermal printing system according to the present invention. In the system of FIG. 3, central processing unit (CPU) 20 is employed with program read only memory (ROM) 21 having a program that compensates for the printing data, data read only memory (ROM) 22 in which data for carrying out nonlinear data compensation is stored, random access memory (RAM) 23, analog-to-digital convertors 24 and 25, random access memory (RAM) 26 and an output buffer 27. These operational circuit elements communicate among themselves by a system data bus 28, which in this example is preferably an eight-bit parallel bus. The voltage appearing at junction point P', which is located between the connection point of reference resistor R1 and thermal print head 2 is fed to analog-to-digital convertor 24, as the actual resistance value data for each of the heating elements $2a_1$–$2a_n$ of thermal print head 2.

In this embodiment, analog-to-digital convertors 24 and 25, program RAM 21, data RAM 22, and RAM's 23 and 26 are respectively selected by the signal that is provided by decoding the address from the CPU so that data corresponding to each heat element is transmitted thereto. All other circuit elements in FIG. 3 operate in the same fashion as those in the embodiment of FIG. 2.

Figure 4:
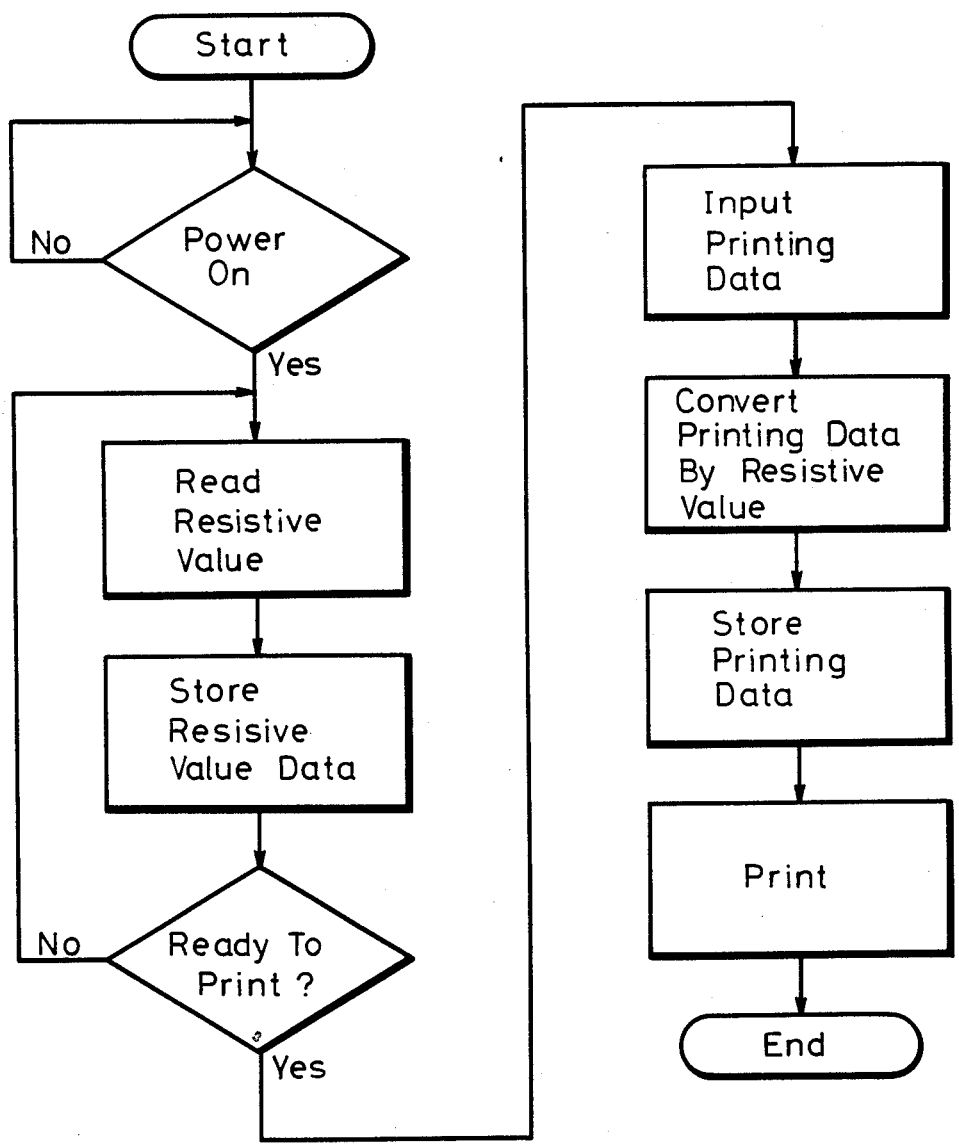
FIG. 4 is a flow chart useful in explaining the operation of the thermal printing system shown in FIG. 3.

The operation of the embodiment of FIG. 3 can be better understood with reference to a flow chart, as shown in FIG. 4. At the time when the thermal printing system is powered up, that is, when the power is turned on, switch S1 is turned off or opened and power is supplied to the common connection point of all of the resistance elements $2a_1$–$2a_n$ of element 2, however, it is understood that only one of the 500 resistive elements is turned on at any one time. At that time the voltage $V'_P$ appearing at junction point P' between reference resistor R1 and thermal print head 2 is converted to a digital signal by analog-to-digital convertor 22 and then latched into RAM 26. This operation is carried out 500 times in this example so that resistive value data for all of the heating elements is stored in RAM 26. Reference is had to FIG. 4 and the loop from the "ready to print" decisional black to the "read resistive value" operation block and this loop is iterated for 500 times. Once this loop has been processed for a number of times equal to the number of heating elements, then the preparation for printing is ended and the printing data is fed in to input terminal 8. When the input signal relative to the last resistive element, that is, $2a_n$, appears at input terminal 8, the input signal has been sequentially supplied to analog-to-digital convertor 24 and converted to a digital signal which has then been latched into a register provided within the central processing unit 20. On the other hand, when the resistive value data relating to the nth head element is read out from RAM 26, such readout data is latched into another register provided within the central processing unit 20. A certain address is then formed from the above two data elements and, on the basis of such address, data for compensating in a nonlinear relationship that was previously written in data RAM 22 is read out therefrom so that the printing data is compensated thereby. That is, because printing data compensated by resistive value data is obtained from the data stored in RAM 22 and latched in RAM 23 even when fluctuation of printing density owing to differences of the resistive value have nonlinear relationships, the printing density can still be compensated. Thus, based on such corrected printing data the thermal printing operating is carried out in the same fashion as described above in relation to the embodiment of FIG. 2.

In this second embodiment, even when the printing density does not fluctuate linearly based upon the differences among the resistive values of the respective heating elements $2a_n$, such nonlinear data as previously stored in RAM 22 can be used to control the conducting time of each head element in response to the resistive value, with the added advantage that it is possible to obtain excellent picture quality with no scattering of the printing density. Furthermore, because resistive value data relative to each of the head elements is detected at the same time, that is, the entire operation is run through each time the thermal printing system is switched on, even though other variations of the resistive value are present it is possible to obtain excellent picture quality with no scattered printing density.

Although illustrative embodiments of the present invention have been described in detail above with reference to the accompanying drawings, it is to be understood that the invention is not limited to those precise embodiments, and that various changes and modifications can be effected therein by one skilled in the art without departing from the scope or spirit of the invention, as defined by the appended claims.

What is claimed is:

1. Apparatus for use in a thermal printing system of the kind having a thermal print head with a plurality of resistive elements for printing an image line-by-line from printing data fed thereto, comprising:
   detector means selectively connected to each of said resistive elements for deriving data corresponding to an actual resistance value of each of said resistive elements;
   memory means connected to receive said derived data from said detector means for retaining said derived data at addresses corresponding to each of said resistive elements; and
   compensating means connected to said memory means and receiving said printing data for compensating said printing data according to said derived data retained in said memory means.

2. Apparatus for use in a thermal printing system according to claim 1, in which said detector means includes a reference resistor connected in series to each of said plurality of resistive elements.

3. Apparatus for use in a thermal printing system according to claim 2, in which said detector means further includes switch means connected in parallel with said reference resistor for removing said reference resistor from the detector means.

4. Apparatus for use in a thermal printing system according to claim 3, in which said detector means further includes digital-to-analog convertor means for converting an analog voltage at a junction between said plurality of resistive elements and said reference resistor into digital derived data for storage in said memory means.

5. Apparatus for use in a thermal printing system according to claim 4, in which said printing data comprises a digital signal and said compensating means includes a digital multiplier means for multiplying said retained derived data from said memory means and said printing data and producing a compensation signal as the product thereof.

6. Apparatus for use in a thermal printing system according to claim 5, in which said compensating means further includes digital adder means for adding an output from said digital multiplier means and said printing data and producing a compensated printing data signal fed to said thermal print head.

7. A thermal printing system, comprising:
plurality of resistive elements arranged substantially in a line for line-by-line printing of an image contained in a data signal;
resistance determining means selectively connected to each of said plurality of resistive elements for deriving data representing an actual resistance value of each of said resistive elements;
memory means connected to said resistance determining means for retaining said data representing said actual resistance values of said resistive elements; and
compensating means connected to said memory means and receiving said data signal for altering said data signal in accordance with said actual resistance values retained within said memory means.

8. A thermal printing system according to claim 7, in which said resistance determining means includes a reference resistor connected in series with a voltage source and each of said plurality of resistive elements.

9. A thermal printing system according to claim 8, in which said resistance determining means includes a switch connected in parallel with said reference resistor for selectively shorting out said reference resistor.

10. A thermal printing system according to claim 9, in which said reference determining means includes analog-to-digital convertor means for converting said data representing an actual resistance value to digital data for storage in said memory means.

11. A thermal printing system according to claim 10, in which said data signal is a digital data signal and said compensating means includes digital multiplier means receiving said retained digital data from said memory means for multiplication by said digital data signal.

12. A thermal printing system according to claim 11, in which said compensating means further includes a digital adder for adding a digital product output from said digital multiplier means to said digital data signal.

13. A method for use in a thermal printing system of the kind having a thermal print head that includes a plurality of resistive elements for printing an image line-by-line in accordance with input printing data fed thereto, comprising the steps of:
determining the actual resistance value of each of said plurality of resistive element of said thermal print head;
retaining said actual resistance values in a memory at an addresss corresponding to each of said plurality of resistive elements;
multiplying each of said retained actual resistance values with a corresponding element in said input printing data for producing a compensation signal therefrom;
adding said compensation signal with said input printing data for compensating said input printing data; and
energizing said thermal print head with said compensated input printing data.

14. A method for use in a thermal printing system according to claim 13, in which said step of determining said actual resistance values includes the steps of connecting a reference resistor in series with a voltage source and each of said plurality of resistive elements in said thermal print head and measuring the respective voltages at the junction of said reference resistor and said plurality of resistive elements.

15. A method for use in a thermal printing system according to claim 14, in which said step of determining said actual resistance value includes the further step of converting said measured voltages at said junction between said reference resistor and said plurality of resistive elements to corresponding digital values.

16. A method for use in a thermal printing system according to claim 15, in which said step of determining said actual resistance value includes the further step of connecting a switch in parallel with said reference resistor for selectively removing said reference resistor from connection with said plurality of resistive elements.

17. A method for use in a thermal printing system according to claim 13, including the step of arranging said actual resistance values in said memory means at locations coresponding to addresses of each of said resistive elements in said thermal print head.

18. A method for use in a thermal printing system according to claim 17, further including the step of bit shifting said output signals from said digital multiplier to said adder for adding to said input printing data.

* * * * *